(12) United States Patent
Heidlebaugh et al.

(10) Patent No.: US 7,236,343 B2
(45) Date of Patent: Jun. 26, 2007

(54) METHOD AND SYSTEM FOR LIGHTNING CURRENT CONDUCTION PROTECTION USING FOIL BONDED STRIPS

(75) Inventors: Diane L. Heidlebaugh, Kenmore, WA (US); Kari L. Stromsland, Seattle, WA (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 11/029,294

(22) Filed: Jan. 5, 2005

(65) Prior Publication Data

US 2006/0146473 A1 Jul. 6, 2006

(51) Int. Cl.
- *H02H 3/00* (2006.01)
- *H02H 1/00* (2006.01)
- *H02H 1/04* (2006.01)
- *H02H 3/22* (2006.01)
- *H02H 9/06* (2006.01)

(52) U.S. Cl. ...................................... 361/218; 361/117

(58) Field of Classification Search ................. 361/117, 361/218
See application file for complete search history.

(56) References Cited

U.S. PATENT DOCUMENTS

| | | | |
|---|---|---|---|
| 3,416,027 A * | 12/1968 | Amason et al. ............... | 315/36 |
| 3,989,984 A | 11/1976 | Amason et al. ............. | 317/2 E |
| 4,237,514 A | 12/1980 | Cline ........................... | 361/117 |
| 4,352,142 A | 9/1982 | Olson .......................... | 361/218 |
| 4,380,039 A | 4/1983 | King ........................... | 361/218 |
| 4,429,341 A | 1/1984 | King ........................... | 361/117 |
| 4,502,093 A | 2/1985 | Saurenman ................. | 361/231 |
| 4,574,325 A | 3/1986 | Holton ....................... | 361/218 |
| 4,628,402 A | 12/1986 | Covey ........................ | 361/218 |
| 4,755,904 A | 7/1988 | Brick .......................... | 361/117 |
| 4,789,918 A | 12/1988 | Bannink, Jr. ................ | 361/218 |
| 4,839,771 A | 6/1989 | Covey ........................ | 361/218 |
| 4,866,839 A | 9/1989 | Covey ........................ | 29/825 |
| 4,905,931 A | 3/1990 | Covey ........................ | 244/1 A |
| 4,912,594 A | 3/1990 | Bannink, Jr. et al. ....... | 361/218 |
| 5,499,782 A | 3/1996 | Domine ..................... | 244/1 A |
| 5,806,796 A | 9/1998 | Healey .................... | 244/117 R |
| 6,794,012 B2 | 9/2004 | Tsotsis ....................... | 428/102 |
| 2002/0081921 A1 | 6/2002 | Vargo et al. ................. | 442/16 |
| 2005/0041362 A1* | 2/2005 | Hall ........................... | 361/225 |
| 2005/0103936 A1 | 5/2005 | Pridham et al. ............ | 244/119 |
| 2005/0213278 A1* | 9/2005 | Hawley ..................... | 361/212 |

FOREIGN PATENT DOCUMENTS

FR 2675767 10/1992

* cited by examiner

*Primary Examiner*—Stephen W. Jackson
*Assistant Examiner*—Dharti H. Patel
(74) *Attorney, Agent, or Firm*—Klein, O'Neil & Singh, LLP; Tejinder Singh

(57) ABSTRACT

An apparatus and method for current protection from lightning strikes is provided. An apparatus for current protection comprises an electrically conductive strip affixed to a surface, such as a structural panel, and electrically bonded to a system current return strip to conduct electricity between the electrically conductive strip and a current return location.

5 Claims, 3 Drawing Sheets

METHOD AND SYSTEM FOR LIGHTNING CURRENT CONDUCTION PROTECTION USING FOIL BONDED STRIPS

BACKGROUND OF THE INVENTION

1. Field of the Invention

The present invention relates to an apparatus and method for both routing and dissipating electrical energy, and more particularly to improving the routing and dissipation of electrical energy received by elements as a result from a lightning strike to a surface that is connected to the elements.

2. Background

The ability to effectively deal with lightning strikes on composite materials that form structural panels for wings, fuselages, fuel tanks, and other components of an aircraft structure is an important consideration for the safety of an aircraft and other means of transportation. Composite materials are highly desirable for structural components due to lower mass, while possessing high structural rigidity and high strength. However, composite materials are not highly conductive and cannot readily dissipate the energy from a lightning strike as efficiently as traditional metal body components used with many conventional aircraft.

Carbon fiber reinforced plastic (CFRP) is one type of composite material used for spar and rib installations. A CFRP structure is about 2000 times more resistive than most metals and consequently CFRP is more prone to spark events when subjected to currents from lightning strikes, especially at interfaces and fasteners. In flammable regions the spark events can trigger catastrophic explosions.

Current methods used to prevent lightning currents from entering flammable regions in aircraft, through systems mounted in flammable vapor boundaries employ bonding wires, straps or dielectric isolators. Improvements over these methods are desirable for providing spark free performance (for example, by minimizing discontinuities in the form of gaps and material interfaces), improved flight performance (for example, by reducing the weight of system spar and rib mount assemblies), and CFRP integration performance.

Therefore, what is desired is a system that can discharge current away from a composite material when lightning strikes.

SUMMARY OF THE INVENTION

In one aspect of the present invention, an apparatus for current protection comprises an electrically conductive strip affixed to a surface; and a system current return strip to conduct electricity between the electrically conductive strip and a current return location.

In another aspect of the present invention, an apparatus for current protection comprises an electrically conductive strip affixed to a surface; an electrically non-conductive strip sandwiched between the electrically conductive strip and the surface; and a system current return strip to conduct electricity between the electrically conductive strip and a current return location.

In yet another aspect of the present invention, an electrical network for electrical current protection comprises a plurality of electrically conductive strips mounted on a surface; and a system current return strip to conduct electricity between at least one of the plurality of electrically conductive strips and a current return location.

In still another aspect of the present invention, an apparatus for current protection comprises a structural panel; a first electrically conductive strip affixed to a first side of the structural panel; a second electrically conductive strip affixed to a second side of the structural panel; a first electrically non-conductive strip sandwiched between the first electrically conductive strip and the first side of the structural panel; a second electrically non-conductive strip sandwiched between the second electrically conductive strip and the second side of the structural panel; a first system current return strip electrically bonded to the electrically conductive strip to conduct electricity between the first electrically conductive strip and a first current return location; and a second system current return strip electrically bonded to the electrically conductive strip to conduct electricity between the second electrically conductive strip and a second current return location.

In still yet another aspect of the present invention, a method for lightning current conduction protection comprises affixing an electrically conductive strip to a surface of a structural panel; and connecting electrically the electrically conductive strip to a current return location.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Broadly, the present invention generally provides an apparatus and method for improving the routing and dissipation of electrical energy received by elements from a lightning strike to a surface that is connected to the elements. The electrical energy routing and dissipation system produced according to the present invention may find beneficial use in many industries including aerospace and industrial applications. Although the following discussion may use an aircraft structural panel as an exemplary demonstration, it is to be understood that this discussion is not limiting and that the present invention may be used in other suitable applications.

Overall aircraft flight performance may be improved by reducing the weight of system spar and rib mount assemblies. By forcing electrical currents through metallic strips rather than a CFRP spar and rib structure, structural performance of the CFRP spar and rib may be improved. By forcing electrical currents through metallic strips rather than a CFRP spar and rib structure, the spark free electrical performance of the CFRP spar and rib may be improved to the effect of avoidance of catastrophic events related to sparking in flammable vapor regions.

Figure 1:
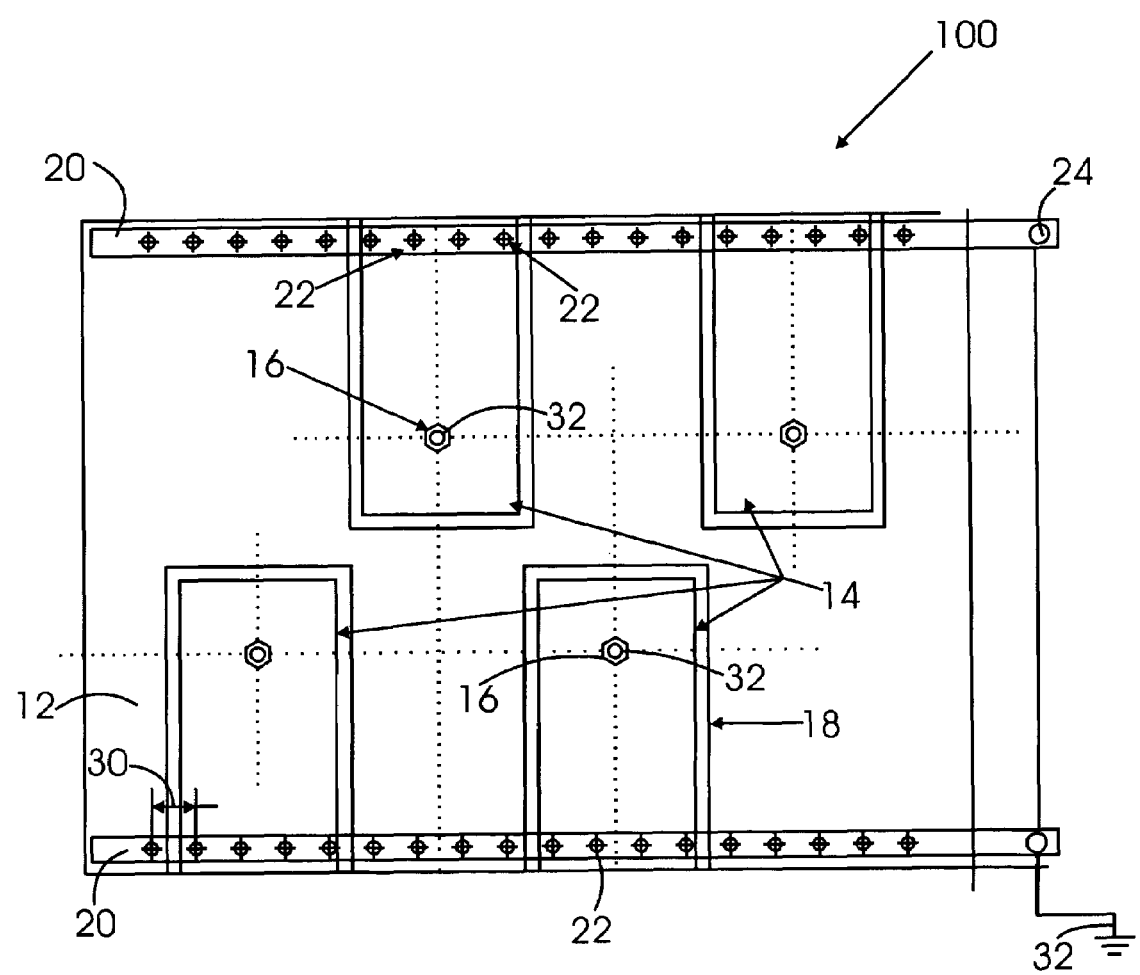
FIG. 1 is a plan view of an electrical network for electrical current protection, according to an embodiment of the present invention.

FIG. 1 shows an exemplary electrical network 100 for electrical current protection. The electrical network may comprise a structural panel 12, suitable for use in a wide variety of aircraft and aerospace applications where an airborne vehicle may experience a lightning strike. The structural panel 12 may be manufactured from suitable materials, such as a polymer or composite material such as carbon fiber reinforced plastic (CFRP). While the structural panel 12 may be immediately recognized as being highly useful and suitable for use with aircraft and aerospace vehicles, the structural panel 12 may be readily adapted for use with ground-based vehicles or ground-based structures wherein the ability to route and dissipate the energy from a lightning strike over a structural panel is a concern.

With further reference to FIG. 1, a plurality of electrically conductive strips 14 may be mounted on the surface of the structural panel 12. The electrically conductive strips 14 may be made of any electrically conductive material that is more electrically conductive than the structural panel 12. For example, the electrically conductive strips may be manufactured of foils made from steel or titanium. Titanium may be advantageous because titanium is galvanically compatible with CFRP and titanium has a relatively lower conductivity compared to other metals. With titanium's lower conductivity (which is close to the conductivity of CFRP) voltage build-up may be reduced and related voltage breakdown-induced sparking may be reduced.

System fittings may be electrically bonded to electrically conductive strips through fasteners. The electrically conductive strips 14 may be structurally bonded to the structural panel 12. The electrically conductive strips 14 may be bonded or co-bonded to the structural panel 12 with adhesive. An electrically non-conductive strip 18 may be sandwiched between at least one of the plurality of electrically conductive strips 14 and the surface of the structural panel 12. The electrically non-conductive strip 18 may be manufactured from an insulating material, such as fiberglass. The electrically non-conductive strip 18 may be larger in area than the electrically conductive strip 14. Even a plurality of electrically non-conductive strips 18 may be sandwiched between the plurality of electrically conductive strips 14 and the surface of the structural panel 12.

A system current return strip (grounding strip) 20 may be used to conduct electricity between at least one of the plurality electrically conductive strips 14 and a current return location (grounding location) 24 or ground 32. The system current return strip 20 may be electrically bonded to the electrically conductive strip 14. The system current return strip 20 may be fastened to the electrically conductive strip 14 with fasteners 22. A fastener distance 30 may separate a plurality of fasteners 22.

Figure 2:
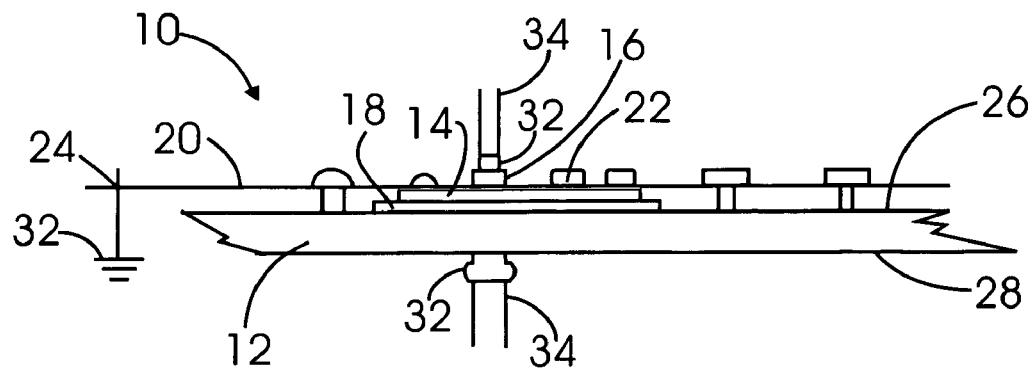
FIG. 2 is a side view of an apparatus for current protection, according to an embodiment of the present invention.

FIG. 2 shows a side view of another embodiment of the present invention. An apparatus 10 for current protection may comprise an electrically conductive strip 14 affixed (such as by bonding, co-bonding, integrally bonding, co-curing, and other suitable manners of bonding materials) to a surface, such as a first surface 26. An electrically non-conductive strip 18 may be sandwiched between the electrically conductive strip 14 and the first surface 26.

A line 34, such as a fuel line, may run through the apparatus 10 by way of a bulkhead fitting 32. The bulkhead fitting 32 may be held in place by a panel fastener 16. The panel fastener 16 and the bulkhead fitting 32 may be used to secure the line 34 in place where needed, such as on a fuel tank (not shown). The bulkhead fitting does not necessarily contact or intersect with a system current return strip (grounding strip) 20.

The reason the conductive strips 14 may be affixed to the panel 12 is to divert electrical energy present on a line 34 or bulkhead fitting 32 or panel 12 away from the panel 12 and away from flammable areas. If the electrical energy is present on the panel 12, it may be diverted to a line 34 or current return, away from the flammable area. If the electrical energy is present on a line 34, it may be diverted away from the panel 12 and directly to a current return location 24.

A system current return strip 20 may be used to conduct electricity between the bulkhead fitting 32, the electrically conductive strip 14, and a grounding location 24.

Figure 3:
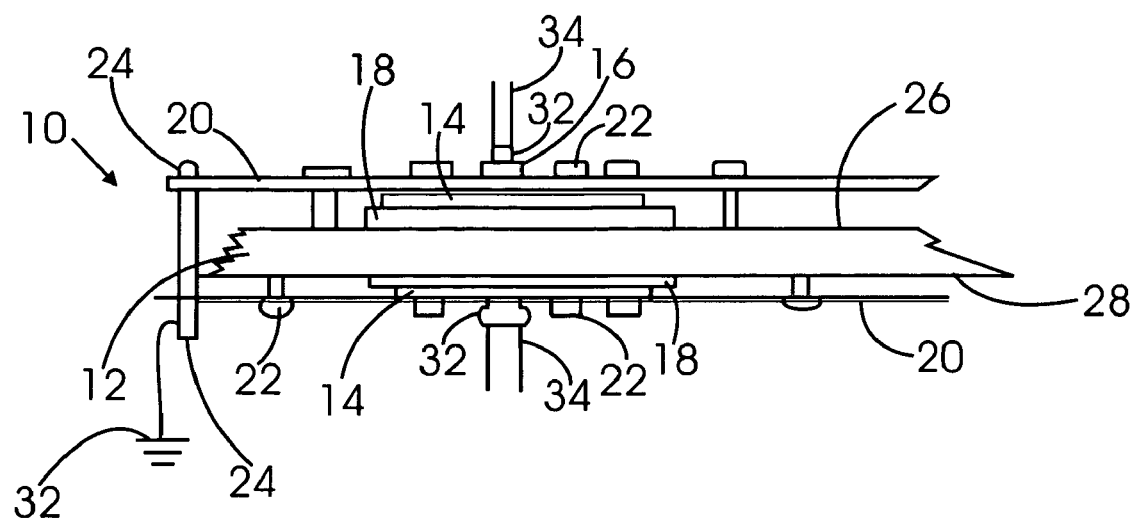
FIG. 3 is a side view of an apparatus for current protection, according to another embodiment of the present invention.

FIG. 3 shows still another embodiment of the apparatus 10. A first electrically conductive strip 14 may be affixed, such as by structurally bonding, to a first side 26 of the structural panel 12. A second electrically conductive strip 14 may be affixed to a second side 28 of the structural panel 12. A first electrically non-conductive strip 18 may be sandwiched between the first electrically conductive strip 14 and the first side 26 of the structural panel 12, while a second electrically non-conductive strip 18 may be sandwiched between the second electrically conductive strip 14 and the second side 28 of the structural panel 12. A first system current return strip 20 may be electrically bonded to the first electrically conductive strip 14 and a first grounding location 24, while a second grounding strip 20 may be electrically bonded to the second electrically conductive strip 14 and a second grounding location 24.

Figure 4:
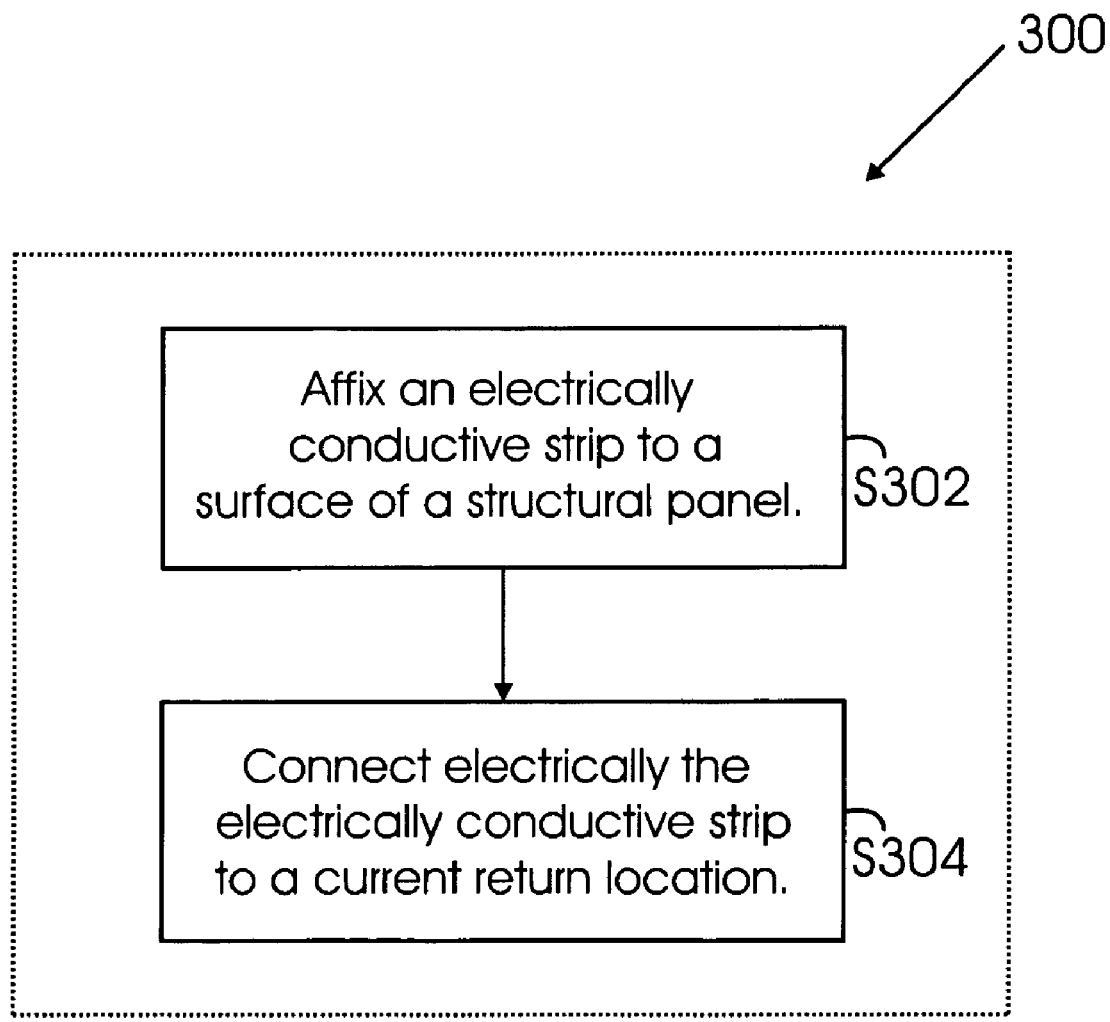
FIG. 4 is a flow chart of a method for lightning current conduction protection, according to still another embodiment of the present invention.

FIG. 4 shows a flow chart of a method 300 for lightning current conduction protection. In step S302 the method may comprise affixing an electrically conductive strip to a surface of a structural panel. In step S304, the method 300 may comprise connecting electrically the electrically conductive strip to a current return location (grounding). An electrically non-conductive strip may be sandwiched between the electrically conductive strip and the structural panel.

Although the present invention has been described with reference to specific embodiments, these embodiments are illustrative only and not limiting. Many other applications and embodiments of the present invention will be apparent in light of this disclosure and the following claims.

The invention claimed is:

1. An apparatus for current protection, comprising:
   a structural panel having an internal surface and an external surface;
   a first electrically conductive strip affixed to the external surface of the structural panel;
   a second electrically conductive strip affixed to the internal surface of the structural panel;
   a first electrically non-conductive strip sandwiched between the first electrically conductive strip and the external surface of the structural panel;
   a second electrically non-conductive strip sandwiched between the second electrically conductive strip and the internal surface of the structural panel;

a first system current return strip electrically bonded to the first electrically conductive strip to conduct electricity between the first electrically conductive strip and a first current return location; and a second system current return strip electrically bonded to the second electrically conductive strip to conduct electricity between the second electrically conductive strip and a second current return location.

2. The apparatus of claim 1, wherein the first electrically conductive strip comprises titanium or steel.

3. The apparatus of claim 1, wherein the first electrically non-conductive strip comprises fiberglass.

4. The apparatus of claim 1, wherein the electrically non-conductive strip is larger in area than the first electrically conductive strip.

5. The apparatus of claim 1, wherein the first system current return strip is electrically bonded to the first electrically conductive strip.

* * * * *